(No Model.) 5 Sheets—Sheet 1.
C. T. SWEET.
MOLDING MACHINE.

No. 301,461. Patented July 1, 1884.

(No Model.)  5 Sheets—Sheet 2.
C. T. SWEET.
MOLDING MACHINE.
No. 301,461. Patented July 1, 1884.
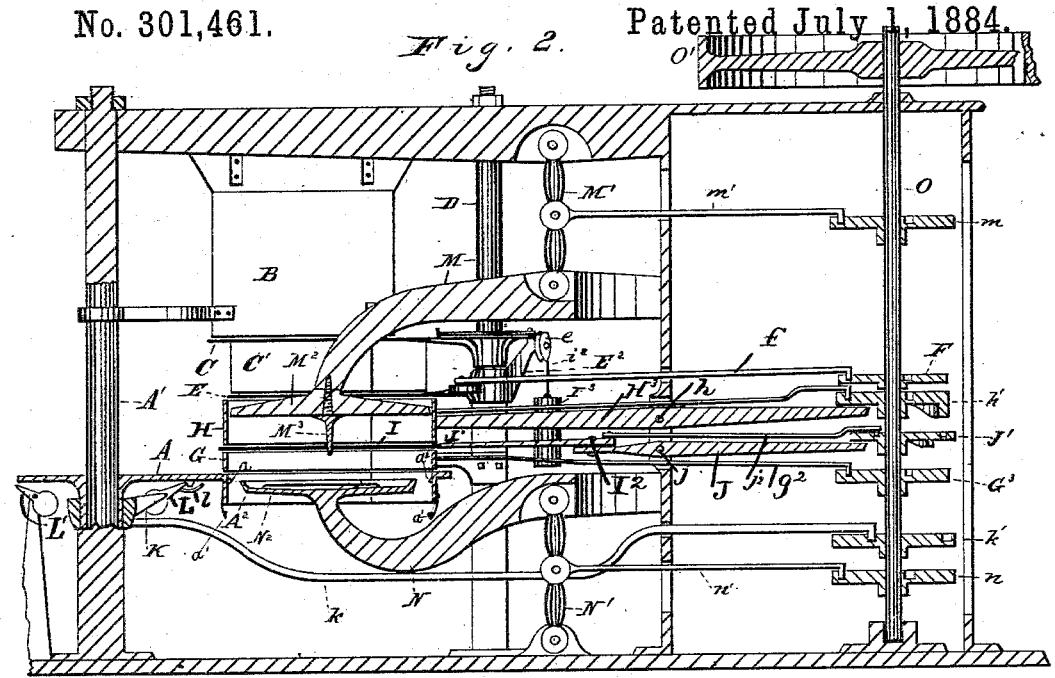
Fig. 2.
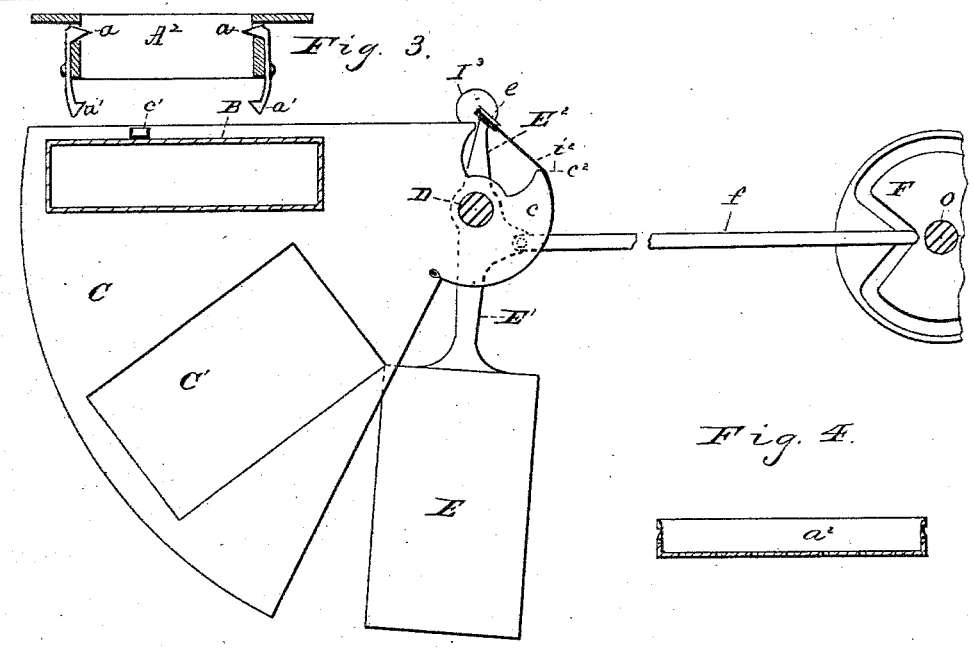
Fig. 3.
Fig. 4.
Witnesses
W. Engel
Geo. W. King
Charles T. Sweet, Inventor
By Leggett & Leggett
Attorneys (No Model.) 5 Sheets—Sheet 3.

C. T. SWEET.
MOLDING MACHINE.

No. 301,461. Patented July 1, 1884.

Witnesses
W. Engel
Geo. W. King

Charles T. Sweet Inventor
By Leggett & Leggett
Attorneys (No Model.) 5 Sheets—Sheet 4.
C. T. SWEET.
MOLDING MACHINE.

No. 301,461. Patented July 1, 1884.

Witnesses
W. Engel
Geo. W. King

Charles T. Sweet  Inventor
By Leggett & Leggett
Attorneys (No Model.)  C. T. SWEET.  5 Sheets—Sheet 5.

MOLDING MACHINE.

No. 301,461.  Patented July 1, 1884.

Witnesses  Charles T. Sweet Inventor
By Leggett & Leggett
Attorneys

UNITED STATES PATENT OFFICE.

CHARLES T. SWEET, OF CLEVELAND, OHIO.

MOLDING-MACHINE.

SPECIFICATION forming part of Letters Patent No. 301,461, dated July 1, 1884.

Application filed September 3, 1883. (No model.)

*To all whom it may concern:*

Be it known that I, CHARLES T. SWEET, of Cleveland, in the county of Cuyahoga and State of Ohio, have invented certain new and useful Improvements in Molding-Machines; and I do hereby declare the following to be a full, clear, and exact description of the invention, such as will enable others skilled in the art to which it pertains to make and use the same.

My invention relates to improvements in molding-machines for metal-founders; and it consists in the combinations, as will be more fully described, and pointed out in the claims.

Figure 1:
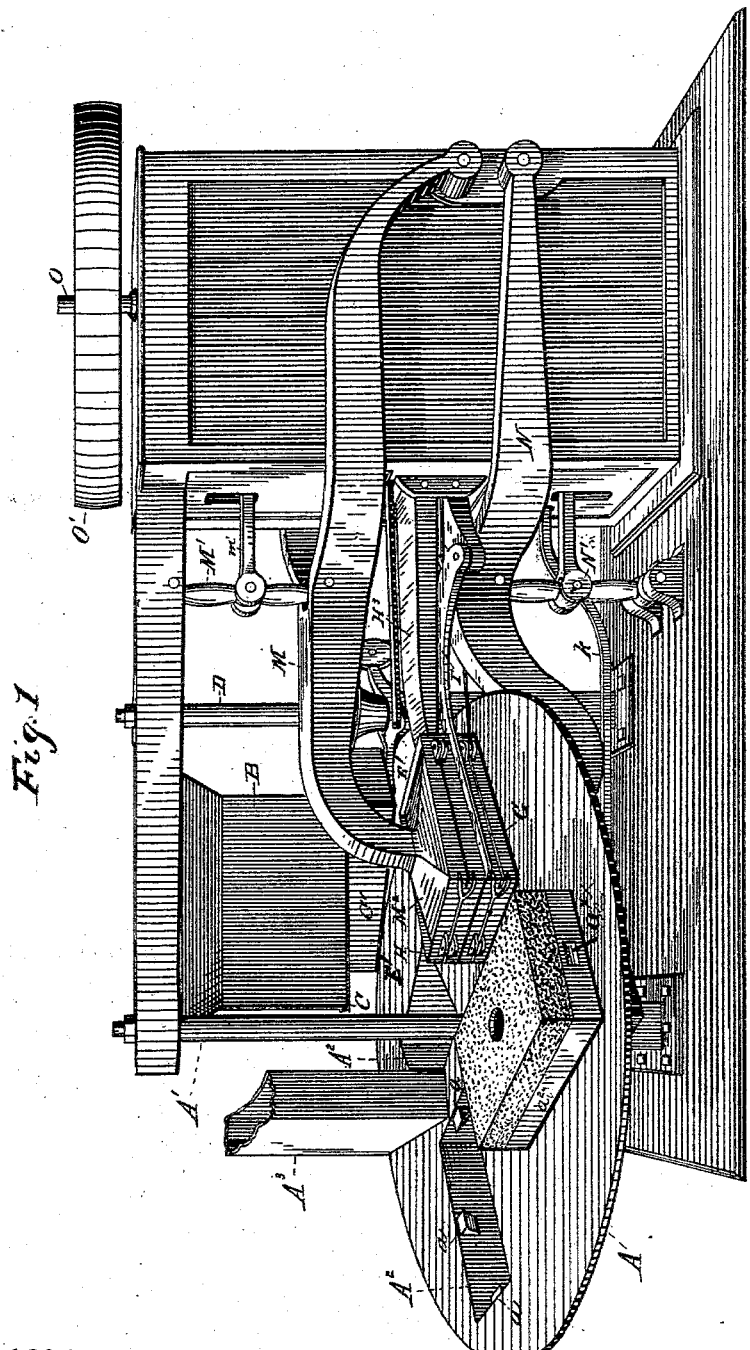
Figure 5:
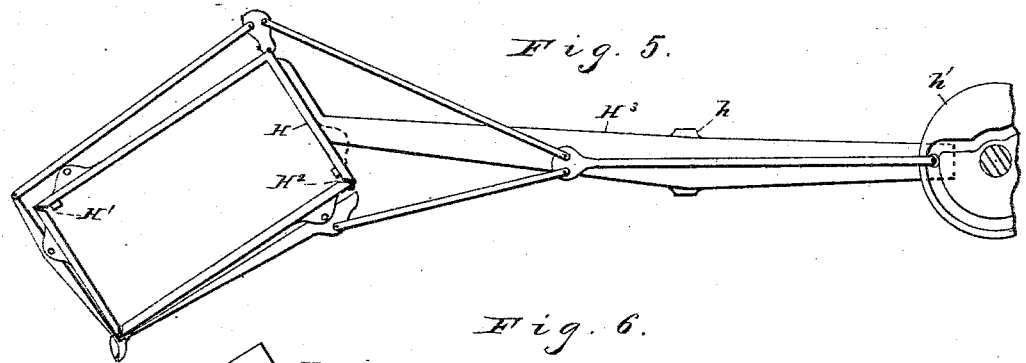
Figure 6:
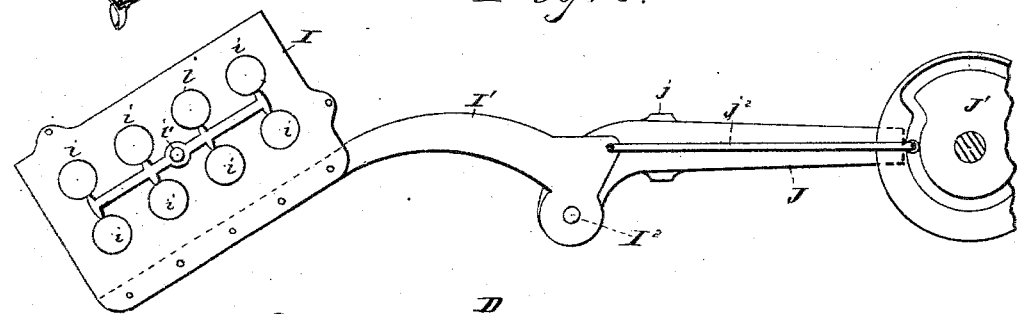
Figure 7:
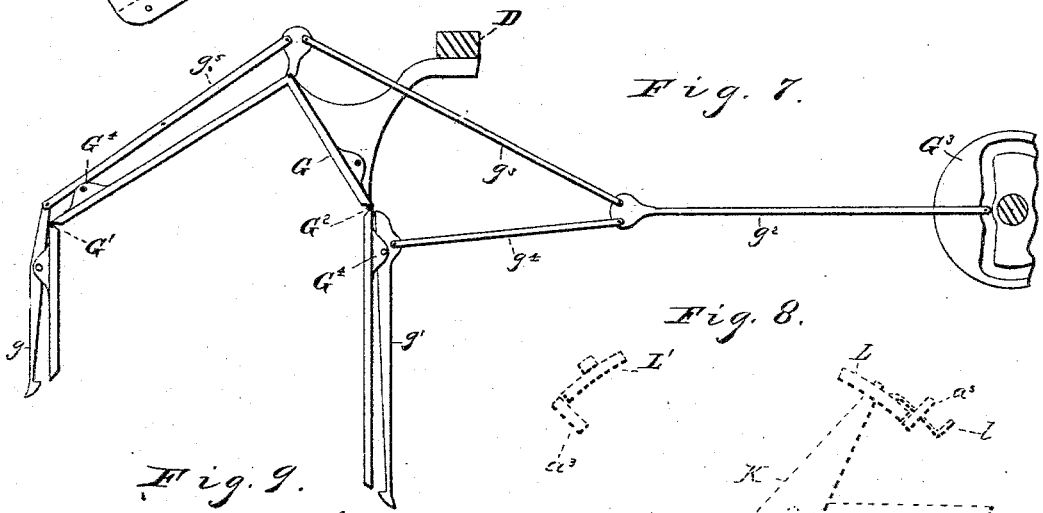
Figure 8:
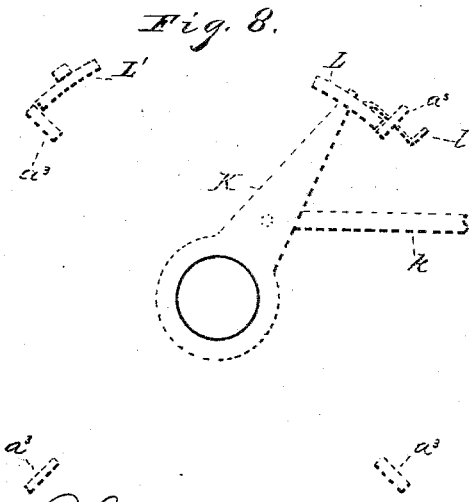
Figure 9:
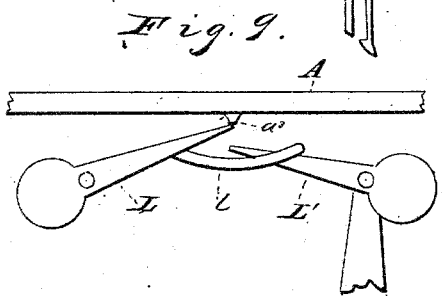
Figure 10:
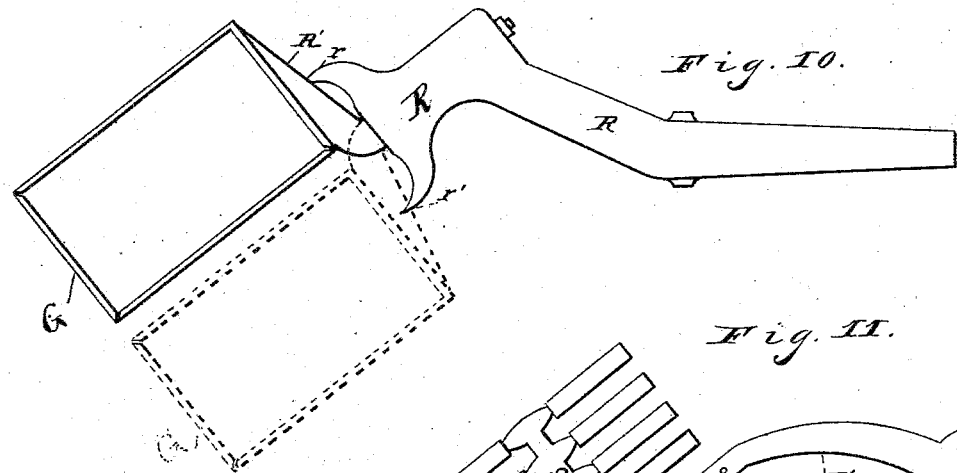
Figure 11:
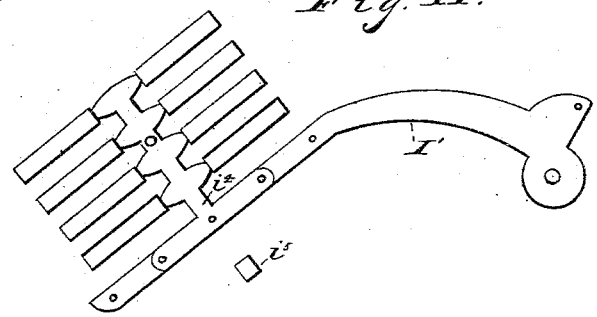
Figure 12:
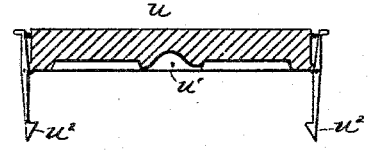
Figure 13:
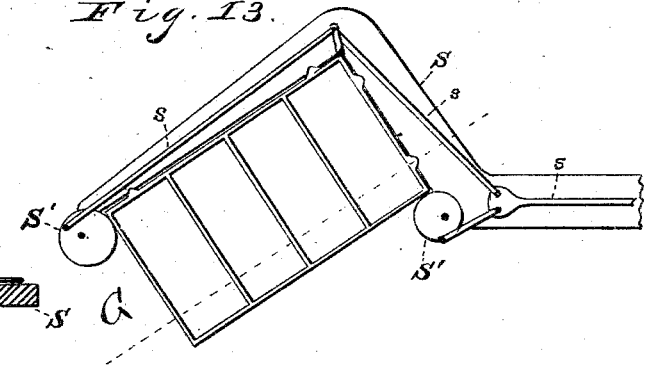
Figure 14:
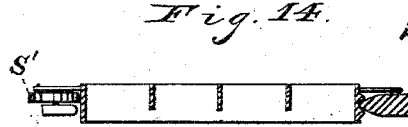
Figure 15:
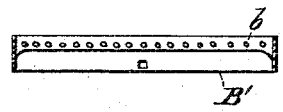
Figure 16:
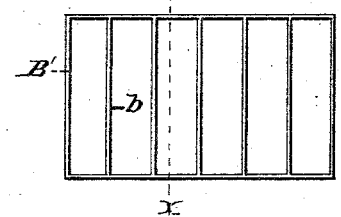
Figure 17:
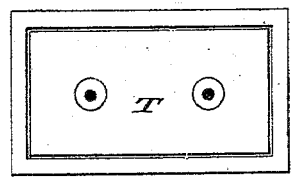
Figure 22:
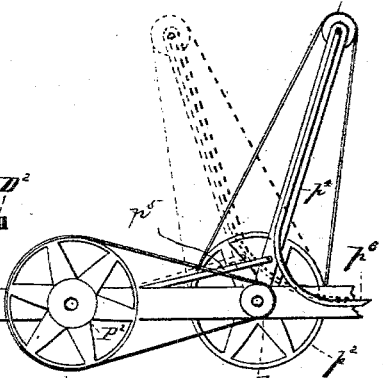
Figure 23:
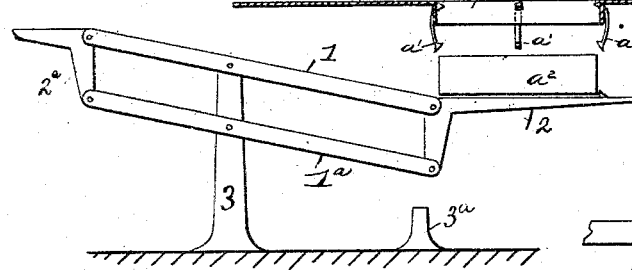

In the drawings, Figure 1 is a view in perspective of my improved molding-machine. Fig. 2 is a vertical longitudinal section of the same. Fig. 3 is a plan view of a swinging table and attachments. Fig. 4 is a vertical section of a bottom board. Fig. 5 is a plan view of the cope and supporting-lever and mechanism for opening the flask. Fig. 6 is a plan view of the match-plate pattern and levers for operating the same. Fig. 7 is a plan view of the drag-flask and attachments. Fig. 8 is a plan view, and Fig. 9 a vertical view, of the mechanism for moving the table. Figs. 10, 11, and 13 are plan views, and Figs. 12 and 14 are vertical sections, of modifications that may be used on the machine. Figs. 15 and 16 are views in detail, the latter a plan view and the former a vertical section on the line $x\ x$ of the latter. Fig. 17 is a plan view, and Figs. 18 and 19 vertical sections, of modifications in detail. Fig. 20 is a plan view, and Fig. 21 an elevation, of a rapping-machine. Fig. 22 is a plan view, and Fig. 24 an elevation, of a brushing and blowing machine. Fig. 23 is a side elevation of a device for placing bottom boards in the lower sand-carriers.

A represents a table revolving with an intermittent motion, and journaled on the column A'. The table is provided with sand-carriers or open depressions $A^2$, extending from the upper surface of the table downward. These carriers are adapted to receive removable bottoms $a^2$, hereinafter described, and for this purpose are provided with spring-dogs $a$ and $a'$, the former above and the latter (see Fig. 23) below. The table shown has four carriers, $A^2$; but the number, size, and shape of such carriers may be modified according to the size of the table and the peculiarities of the work to be performed. The removable bottoms $a^2$ may be flat boards, like the ordinary bottom boards of flasks, but are preferably made with sides, the inner and upper edges of which are chamfered down, as shown in Fig. 4. The ends also may have a hole or depression, $a^x$, to engage the fingers $a$, as shown in Fig. 1, and both the bottom and sides or either may be perforated to give vent to the mold. A preferable way of placing these false bottoms in the carriers is shown in Fig. 23, hereinafter described. With each movement of this table A one of the sand-carriers provided with a removable bottom, $a^2$, supported by the dogs $a'$, is brought under the sand-container $A^3$, where it is filled with sand. As the table advances, the sand in the carrier is "struck off" flush with the top of the table by means of the bottom of the container, and at the next station or stopping-place of the table the sand in the carrier is compressed in a suitable manner, and forms the bottom part of the mold. The container $A^3$ may be so located that it will be directly over the carrier when the table is at rest; but this arrangement is not essential. The container $A^3$ is supported in any convenient manner to the frame-work or column A'.

B is also a sand-container for supplying sand for the upper part of the mold, known as the "cope." This container is preferably supported by the frame above and from the column A', and, like the container $A^3$, may be supplied with sand in any manner.

C is a swinging table supported by the column D, journaled thereon, and provided with the sand-carrier C', which in turn is provided with a swinging bottom, E, that is supported by the arm E', that is also journaled on the column D. The table C has a segmental part, $c$, that has for its center the center of the column D. To the periphery of this segment is attached a cord, strap, or cable, $i$, leading on the pulley $e$ and attached to the weight I. The pulley $e$ is supported by the arm $E^2$, that is a continuation of the arm E'.

To the arm E' is pivoted the rod $f$, the opposite end of which has a pin, hook, or roller engaging the groove in the cam F. Once in a revolution of the cam F the rod $f$ and the parts E and E' are at the limits of their travel to the left hand, as shown in Fig. 3. The turning of the cam F forces the rod $f$ and the parts E and E' to the right hand. Just as the bottom board, E, comes under the carrier C' the arm E² engages the point $c^2$, by means of which the table C is carried along with the part E until the carrier C' is under the container B, when the carrier C' is filled with sand. Here the parts C and E remain at rest until the part E is again drawn to the right by the said cam. The table C, by means of the weight I, moves with the part E until the stop $c'$, attached to the table C, engages the container B and forces the table to stop. The bottom board, E, continues on until it is withdrawn from under the carrier C', as shown in Fig. 3. By this means the sand in the container C' is dropped into the top part of the half-flask, that is immediately below it when the table C stops and the board E is withdrawn. The next left-hand motion of the board E strikes off the sand in the half-flask, and retains in the carrier C' any surplus sand that there may be after filling the flask.

The lower part of the flask G and the upper part or cope, H, are shown, respectively, in Figs. 7 and 5. The half-flask is attached to the column D and drags upon the table A, while the cope is attached to and supported by the lever $H^3$. These two halves of the flask G and H open simultaneously and in the same direction, and at the proper time to allow the complete mold to be carried away from the flask by the turning of the table.

The construction of the two parts of the flask and the mechanism for opening them is the same, and by describing one the other will also be understood.

The flask G has two sides, hinged, respectively, at the corners G' and G², and opening as shown in Fig. 7, and these opening sides have respectively the hook-levers (known as "snaps") $g$ and $g'$ pivotally attached and operated by the cam $G^3$, by means of the connecting-levers $g^2$, $g^3$, $g^4$, and $g^5$. When the flask is closed, these two levers or snaps hook over the corner of the flask and hold the flask from being opened by a pressure from within. When the rods actuated by the cam $G^3$ first draw upon these levers or snaps $g$ and $g'$, the hook ends are drawn back from the engagement with the corner of the flask, after which the back ends of the levers, coming in contact with their respective sides, the levers cannot be drawn farther except by opening the sides of the flask, which is done, as shown in Fig. 7. As soon as the table A has carried away the completed molds the action of the cams $G^3$ and $h'$ again close the two parts of the flask. $G^4$ are ears with steadying-pins attached, that engage holes on similar ears on the parts H and I. The part H or the cope, as aforesaid, is supported by the lever $H^3$. This lever is fulcrumed at $h$, and the end of the lever passes under the cam $h'$. This cam has two inclines pendent from the bottom side, that actuate the lever vertically, and by pressing down the right-hand end of the lever causes the left-hand end, together with the attached cope, to be raised at the proper time for removing the pattern from the mold, and is again raised when the pattern is returned to the flask. These snap-flasks, as operated on the machine, may have a partition-board, I, (shown in Fig. 6,) that separates the two parts of the flask, and to which are attached the patterns, and is known as a "match-plate pattern," and is similar to those in ordinary use, except that it projects beyond the flask for attachment to the arm I'. In case there are more than one pattern in the flask, suitable gates are attached to the match-plate connecting the patterns, and one or more holes, as at $i'$, may be had in the gates to receive the end of the sprue, when it is pressed into the sand to form the sprue-hole into which the molten metal is poured.

The match I is attached to the arm I', that is pivoted to the lever J, that is fulcrumed at $j$, and extends under the cam J', and is then actuated vertically by an incline pendent from the bottom of the cam J'. The position and shape of the said inclines are such that by means of downward pressure on the lever J the match I is raised at the same time that the cope H is raised, but only half the distance, so that the board I, when raised, is held midway between the two parts of the flask, and free to be removed from between them. This is accomplished by means of the rod $j^2$, that when forced to the left hand by the cam J', turns the lever I' and its pivotal point $I^2$ and swings the match-plate I out from between the parts of the said flask. The shape and position of the cam J' and the attached incline below and the relation of parts are such that the match I remains in this elevated position outside the flask until after the cope has been lowered to its position on the drag-flask below; second, until the flask has been opened and the molds carried away on the table A, and, third, until the molds are closed and the cope-flask again raised, after which the match I is swung back to its position between the parts of the flask, and the match and the cope-flask H are lowered down, closing the flask in the proper manner preparatory to making another mold.

M and N are compressing-levers, forked at the right hand, and embracing the frame-work and fulcrumed thereto, as shown in Fig. 1. These levers are actuated, respectively, by the toggle-joints M' and N', that in turn are operated by the rods $m'$ and $n'$, that are moved to the right and left hand at the proper time by the respective cams $m$ and $n$. When the parts are in the position shown in Figs. 1 and 2, the toggle-joints are in a straight line and the levers are at their nearest approach to each other. When, by the action of the said cams $m$ and $n$, and by means of the connecting-rods $m'$ and $n'$, the toggle-joints are drawn to the right hand, the said levers M and N, will be separated some distance farther apart than shown in Figs. 1 and 2. Attached to the said levers M and N, respectively, are the compressing-platens $M^2$ and $N^2$. These plates are preferably made detachable and adjustable. The platen M² is provided with the sprue M³, that may have a screw end above, and be a convenient means of attaching the said platen to the said lever. The lower end of the sprue passes down through the sand and into the orifice $i'$, (see Fig. 6,) and thus forms an opening in the mold, into which the molten metal is poured, as aforesaid. More than one sprue may be had when required, and the sprue or sprues may be located on the plate in such position as may be required.

K is an arm journaled on the column A', or on the hub of the table A, and connected by the rod $k$ to the cam $k'$, by means of which it is turned forward and back at the proper time, moving through about a quarter of a circle.

To the end of the arm K is attached the pawl L, that is weighted at the short end, so that the long end is always pressed against the bottom of the table A.

To the pawl L is attached the rod $l$, bent at right angles near the end, as shown in Fig. 8.

L' is a dog similar in shape to the pawl L, but is pivoted to a stationary support, and also engages the bosses $a^3$, but from the opposite direction from the pawl L. It will also be seen that the pawl L engages the said bosses on the inner ends—that is, toward the center of the table A—while the dog L' engages the bosses on the outer ends. The position of these parts is shown in dotted lines in Fig. 8, where the pawl and dog are shown engaging different bosses and holding the table from turning in either direction. By means of the cam $k'$ and the rod $k$ the arm K is at the proper time moved to the left. As the pawl L passes the dog L' the bent end of the rod $l$ engages the dog L' and draws it from its engagement with the boss. (See Fig. 9.) The said rod holds the dog L' in this position until after the pawl L has engaged the boss and has been again drawn to the right, turning the table with it. When the pawl L, in its movement to the right, has released the dog L', the latter will drag along against the table until it encounters the next boss, and just at this time the movement of the arm K ceases, and the pawl and dog remain in the position shown Fig. 8 until another movement of the table is required. I is an upright shaft provided with the driving-pulley O', and has attached the cams already described.

The operation of the device is as follows: Sand is supplied to the containers A³ and B, and bottom boards, $a^2$, are supplied in turn to the carriers A². These boards rest at first on the dogs $a'$, and the sides of the boards extend up at least to the sides of the carriers, and thus form a box to hold sand. The next movement of the table passes the carrier under the container A³, where it is filled with sand. The next movement of the table brings the said sand-carrier under the flask and over the platen N², or rather between the platens N² and M², which at this time are widely separated and out of the way. Next the upper sand-carrier, C', comes forward and discharges its load of sand into the cope-flask and retires in the manner already described. Next the compressing-levers are set in motion. The platen N² forces the bottom board, $a^2$, up through the carrier A² to the top of the table, where it is held by the dogs $a$, and by this means the sand is packed firmly up under the match-plate I and around any portions of the pattern that may be attached to the lower side thereof. In the meantime, and simultaneous therewith, the platen M², armed with the projecting sprue aforesaid, descends upon the sand in the cope-flask and presses the sand firmly upon the top of the board I and the patterns and gates attached thereon. Next the compressing-levers are spread apart, the two parts of the flask separate, the match-plate I and the patterns are removed, the mold is closed, the flasks open sidewise, and the completed mold, by the next move of the table, is brought to the front, as shown in Fig. 1, ready to be removed from the machine.

In Fig. 16 is shown a frame, B', and set of bars $b$, adapted to be laid on the top of the sand in the cope, so that when the disk M² descends it will press the said bars into the sand, where they will remain and help to hold the sand in place when the cope is lifted from the pattern. These bars, also, when so desired, may be laid in the cope before it has received the sand.

In the cross-section, Fig. 15, B' represents an end piece, and $b$ one of the bars, provided with holes to engage the sand, and cut away on the bottom in any desired shape to avoid contact with the pattern.

Figure 20:
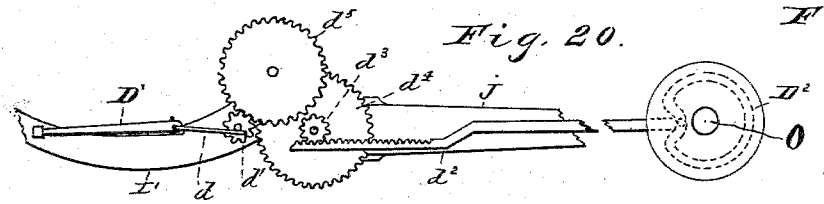
Figure 21:
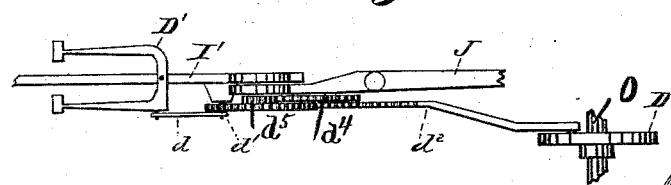

In Figs. 20 and 21 are shown a rapping device to rap the match-plate I and loosen it and the pattern from the sand just as the cope is about to be raised.

D' is a lever, bent as shown, and with a hammer attached to each end, and pivoted in its center to the arm I', and so arranged that the hammers may strike the said lever or the match-plate I. A pitman, $d$, connects with a wrist on the pinion $d'$, as shown.

D² is a cam that once in a revolution makes in quick succession a thrust forward and back with the rod $d^2$, on the end of which is a rack engaging the pinion $d^3$, that may be integral with the gear $d^4$, and the two are journaled on the pin I², Fig. 6, which extends beyond the lever I' for the purpose. The gear $d^4$ engages a pinion (not shown) attached to and having a common axis with the gear $d^5$. The said thrust of the lever $d^2$ forward and back, and the attached rack and the engaging gears, cause the gear $d'$ to revolve rapidly, and cause the hammers to give a succession of quick, sharp raps just as the cope and pattern are raised. The cam D² may be placed on the shaft O, but preferably on a counter-shaft.

Figure 24:
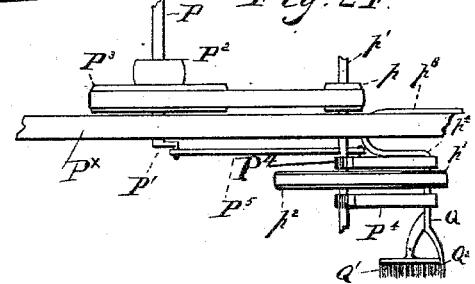

The brushing and blowing device shown in Figs. 22 and 24, may be constructed as follows:

P is a shaft, with a crank, P', at one end, and has attached pulleys $P^2$ and $P^3$, the former a driving-pulley, and the latter connected by a belt with the pulley $p$ on the shaft $p'$. This shaft also has attached the pulley $p^2$, that drives, by belt, the pulley $p^3$, attached to the hollow forked spindle Q, to which in turn is attached the brush $Q'$ to one prong, while the other hollow prong, $Q^2$, furnishes a nozzle for the air-blast that is connected to the hollow spindle by means of the flexible tube $p^6$.

$P^4$ is a swing-frame journaled on the shaft $p'$, and actuated or swung by means of a pitman, $P^5$, attaching it to the crank $P'$, as shown. As the pattern is withdrawn from the mold it passes under the said brush and nozzle, and by means of the oscillation of the frame every part of the pattern is speedily cleaned of refuse sand.

The shafts P and $p'$ are journaled in a bar, $P^×$, which may be attached to the column $A'$, and power may be transmitted, by belt, to the pulley $P^2$ from a pulley on the shaft O.

Figure 18:
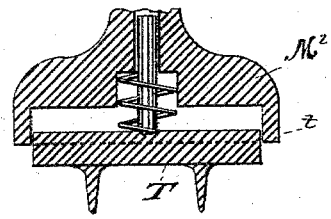
Figure 19:
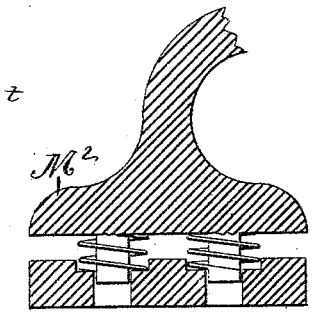

Figs. 18 and 19 are modifications of disks that may be used in the place of the disk $M^2$. The operation of these disks is as follows: The portions of the disks advanced by means of the springs, by first coming in contact with the sand, press more or less of the sand sidewise, so that the other parts—as the hubs in Fig. 19, and the outer rim in Fig. 18—will have more than their proportion of sand to press, and consequently the sand under these parts will be pressed harder than other portions. As the pressure increases the advanced portions recede, compressing the said springs until the whole surface of the disk is in line. Also, the depressions may be made on the face of the disk, to lessen still more the pressure on any given point. Also, the corners of the advanced parts may be rounded, which will cause more sand to be forced laterally into the spaces when the sand requires to be packed extremely hard.

In Fig. 10 is shown the lever R, that may take the place of the lever $H^2$. (Shown in Fig. 5.) The flask G is attached to the arm $R'$, that is journaled in the head of the lever R, so that the flask may be turned to either of the positions shown. The point $r$ extends under the arm $R'$, and supports it and the flask, and when the flask is turned in the position shown in the dotted lines the point $r'$ will be under the arm $R'$, and will support the flask in that position.

In Fig. 11 are shown patterns connected by proper gates, and attached to the arm $I'$, (see Fig. 6,) but without the match-plate to separate the flasks. A core, $i^5$, is provided to fill the space where the plate $i^4$ extends through the flask for attachment to the said lever $I'$.

In Fig. 12, $u$ is a follow-board, that is placed over the pattern and lower part of the flask, and cut out at $u'$, as may be required, to fit over the pattern, and provided with spring-hooks that engage holes in the table A and hold the follow-board, so that the sand may be pressed from the bottom without the counter-pressure from above. The lower compressing-disk is timed to operate before the upper disk, so that the lower part of the mold is first pressed, and afterward the follow-board is removed and the cope is filled and pressed.

In Fig. 13 is shown a manner of holding flasks G by means of the bent arm S. The inner edge of this arm is brought to an edge and engages lips on the flask, as shown at the right hand in Fig. 14.

$S'$ are eccentrics operated by the rods $s$, and operated so as to press the flask against the said arm S.

In Fig. 23 is shown an arrangement for placing the bottom boards, $a^2$, in the sand-carriers $A^2$. This arrangement is mounted on the bed-plate of the machine beneath the table A, and consists of a rectangular frame composed of the sections 1 $1^a$, which are united at their inner ends by the holder 2 and at their outer ends by the handle-piece $2^a$. The sections 1 $1^a$ are pivoted centrally upon the support 3, which rests upon the bed of the machine, and the movements of the inner ends of the sections 1 $1^a$ and the holder 2 are limited by the stop $3^a$, also mounted upon the bed of the machine. By manipulating the handle $2^a$ the bottom $a^2$ upon the holder 2 is moved up into the carrier $A^2$.

What I claim is—

1. In a molding-machine, the combination, with an intermittingly-rotating table provided with a series of sand-carriers and connections for actuating said table, of a sand-container and a stationary flask, whereby the said sand-carriers are brought successively under the sand-container beneath the flask, for compression of the sand-mold, and from beneath the flask after compression, substantially as described.

2. In a molding-machine, the sand-carriers $A^2$, provided with the dogs $a$ and $a'$, substantially as described.

3. In a molding-machine, the combination, with a molding-table having one or more openings through it, of a movable bottom board loosely fitting in each opening and adapted to retain sand therein, and devices for forcing each bottom board and the sand up through each opening and against the under side of a pattern, substantially as set forth.

4. In a molding-machine, the combination, with the intermittingly-rotating table and its series of sand-carriers provided with spring-retainers, of the bottom boards, $a^2$, recessed at their sides, substantially as described.

5. The combination, with the intermittingly-rotating table A and mechanism for actuating and holding the same, of the open sand-carriers $A^2$, adapted in turn to come beneath the pattern, substantially as described.

6. In a molding-machine, the combination, with an intermittingly-rotating table provided with a series of open sand-carriers, mechanism for operating said table, and the lower half-flask, of devices for forcing the sand in said carriers up into the stationary flask and compressing it against the lower side of the pattern.

7. In a molding-machine, the combination, with an intermittingly-rotating table provided with a series of open sand-carriers, the lower half-flask, and the cope, of devices for forcing the sand in said carriers up into the lower half-flask, devices for filling the cope with sand, and devices for simultaneously compressing the sand in the cope and drag or lower half-flask from above and below, substantially as set forth.

8. In a molding-machine, the combination, with an intermittingly-rotating table provided with a series of sand-carriers, of the levers M, provided with the platens M², having a sprue or sprues, M³, a drag-flask and cope, and connections with said arms for compressing the mold and at the same time forming a sprue hole or holes in the cope-mold, substantially as described.

9. The combination, with an intermittingly-rotating table provided with a series of sand-carriers, of the arms M' N', carrying platens, the rods m' n', and interposed toggle-joint, and the cams m and n, mounted upon a vertical rotating shaft, substantially as described.

10. The combination, with an intermittingly-rotating table having a series of open sand-carriers, of a swinging sand-carrier provided with a movable bottom, a lower half-flask and cope, and suitable operative connections for actuating the rotating table, sand-carrier, and movable bottom, substantially as and for the purpose set forth.

11. The combination, with the swinging table and its carrier, of the bottom board, E, provided with the journaled arm E', as shown, and the rod f and cam F, substantially as described.

12. The combination, with the swinging table and its sand-carrier, of the arm E', the arm E², integral with the arm E', and provided with the pulley r, the cord i, and the weight T', substantially as described.

13. The cope-flask provided with hinged sides, and the supporting-lever for said flask, in combination with the connections for raising and lowering said lever and for opening and closing the flask, substantially as specified.

14. The combination, with the lower half-flask and cope and the devices for carrying the same, of the match-plate interposed between said flask and cope, the oscillating lever for supporting said plate, and the devices arranged to be raised and lowered automatically, substantially as and for the purpose set forth.

15. The combination of the match-plate I, the arm I', and the lever J, substantially as described.

16. The flasks G and H, provided with hinged sides, in combination with lever-snaps provided with suitable actuating mechanism to open and close them automatically, as required, substantially as described.

17. The combination, with the intermittingly-rotating table A, provided with stops on its under side, of the oscillating arm K, provided with the pawl L and the rod l and the dog L', substantially as described.

18. The combination, with a revolving table provided with one or more openings and a suitable drag-flask and a cope, of a match-plate and means for operating the match-plate in connection with the drag-flask and cope, and the platens M² and N².

19. In a molding-machine, the combination, with a drag-flask, cope, and intermediate match-plate, and mechanism for severally operating them, of a hammer and means for operating it to jar the match-plate, and arranged to operate while the pattern is being withdrawn, substantially as set forth.

20. In a molding-machine, the combination, with drag-flask, cope, and match-plate, and mechanism for severally operating them, of devices, substantially as described, for brushing and blowing the sand from the match-plate, substantially as set forth.

In testimony whereof I sign this specification, in the presence of two witnesses, this 17th day of August, 1883.

CHARLES T. SWEET.

Witnesses:
FRANK HUBBELL,
GEO. W. KING.